United States Patent Office 3,214,198
Patented Oct. 26, 1965

3,214,198
FLUID-TIGHT PIPE JOINT HAVING A CAMMED FLEXIBLE LIP
Alphonse Peuchmaur, Boulogne-sur-Seine, France, assignor to Commissariat a l'Energie Atomique, Paris, France
Filed Aug. 2, 1962, Ser. No. 214,320
Claims priority, application France, Aug. 9, 1961, 870,421
2 Claims. (Cl. 285—110)

The present invention relates to fluid-tight connections and is intended to provide a device for rigidly assembling two tubular elements such as a tube and a sheath coaxial thereto; the tube constituting, for example a pressure tube projecting into the core of a nuclear reactor having liquid moderator and the sheath constituting the end of a channel receiving the tube.

It is already known to use devices for assembling two tubular elements which comprise an end portion of one of the elements, having an outer frusto-conical surface and a diameter such that it fits into the end portion of the other element and bears against the inner wall of the latter, the two elements having a threaded connection.

This device has the drawback, inter alia, that the same members, i.e. the tubular elements, fullfill the functions both of sealing and mechanically interlocking: it is therefore not possible to control the sealing force (force with which one of the members is applied against the other) except by acting on the threaded connection.

It is an object of the invention to provide a fluid tight fastening device wherein the solidarisation of the two tubular elements and the sealing action are controlled by separate members which may thus be better adapted to their particular purpose.

Figure 3:
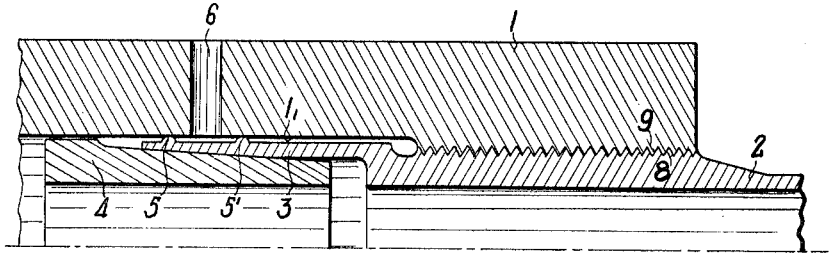
Figure 4:
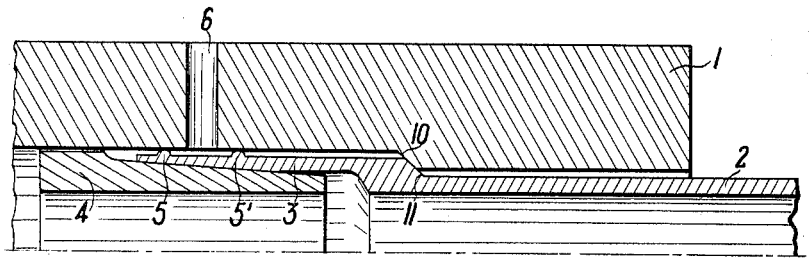
Figure 5:
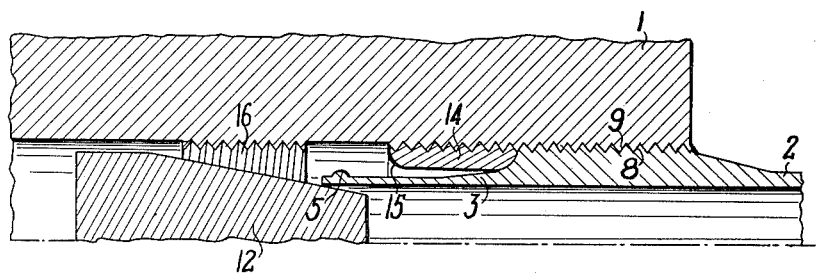
Figure 6:
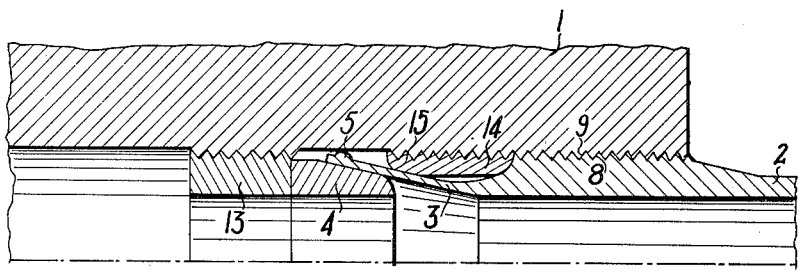

In order that the invention may be more easily understood, reference will now be made to the accompanying drawings which show some embodiments thereof by way of example and in which:

FIGURES 1 to 4 are side elevations in half section of four different embodiments of fastening devices according to the invention, and FIGURES 5 and 6 are side elevations in half section of a fifth embodiment, in the relative positions assumed during assembly and after assembly, respectively.

Referring now to the drawings, each of the FIGURES 1 to 6 shows a first element, consisting in a sheath 1, secured to a second element, consisting in a tube 2 provided with a thin terminal lip 3 the lip consists in an annular skirt coaxial to the tube 2 and having a radial thickness small enough so that it may be slightly deformed radially outwardly.

Figure 1:
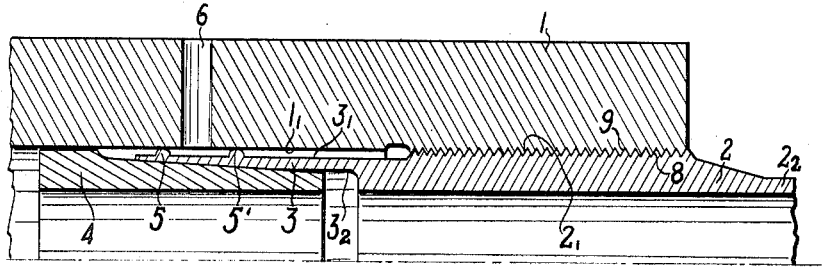

In the embodiment illustrated in FIGURE 1, the radially outer surface $3_1$ of the lip 3 is cylindrical while the inner surface $3_2$ is successively cylindrical, and frusto-conical so that the lip tapers toward its free end (to the left in the drawing).

In order to ensure a fluid-tight contact, a ferrule 4 is forced into the lip 3, said ferrule 4 being radially outwardly limited by a frusto-conical surface, the small base of which confronts the tube (at the right in the drawing). The diameter of the small base and the conical taper of the ferrule are such that when the ferrule is forced into the lip, the latter is expanded against the inner surface $1_1$ of the sheath 1. The ferrule may be forced by any suitable means, particularly by hammering or with a jack abutting the sheath 1 or abutting a member integral therewith. The ferrule may be maintained in its engaged position either by wedging (as illustrated in FIGURE 1) or by a permanent axial stop comprising, for example, threaded rings (not shown) screwed into the sheath. The axial thrust exerted on the ferrule should be sufficient to apply the lip 3 against the position facing the inner surface $1_1$ of the sheath with a radially directed force adapted to ensure a sealing which remains fluid-tight under the severest pressure of the elements.

In order to improve the tightness of the seal, the outer surface $3_1$ of the lip 3 and/or the confronting portion of the inner surface $1_1$ of the sheath 1 is provided with at least one annular rib 5 which distributes the total tightening stress transmitted by the lip to the sheath over an annular surface having a short axial length; the rib 5 is preferably provided with a convex section (contact over a reduced surface), or with a V-shaped section (contact along a live edge): the tightening pressure per surface unit is increased in both cases and the sealing is improved.

For more safety, a double seal may be provided by using two annular ribs 5 and 5' (FIGURE 1). In this case undersirable liquid leakages which may have passed over the first rib 5 from the inside of the tube 2 may be detected by evacuating them through a passage 6 formed in the sheath 1 and opening out opopsite the lip 3 between the two ribs 5 and 5'.

The sealing means hereinbefore described would not be adapted to secure the two elements against axial separations. This function is fulfilled by a threaded connection between an outer thread 8 machined on a bulged portion $2_1$ of the tube 2 and an internal thread 9 of the sheath 1.

The thin lip 3 is preferably radially outwardly offset with respect to the part $2_2$ of the tube 2 preceding the bulged part $2_1$; the annular space may thus receive a ring 4, the bore of which has a diameter equal to that of the bore of tube 2, whereby the introduction or removal of fuel elements and the flow of cooling liquid are rendered easier.

The embodiment illustrated in FIGURE 1 is adapted to introduction of the tube 2 from the right to the left, i.e. beginning with the lip 3: the smallest diameter of the internal thread should thus exceed the overall diameter of the lip including the sealing ribs.

Figure 2:
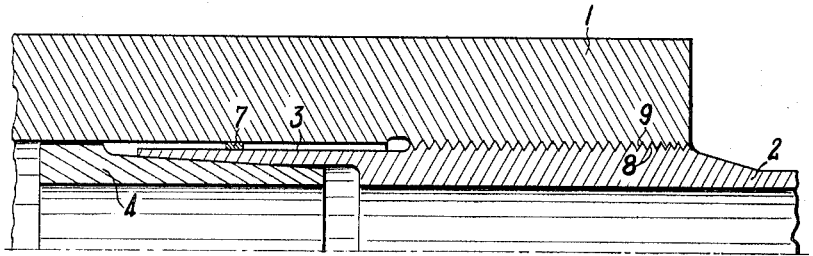

In the embodiment of FIGURE 2 the surfaces facing the lip 3 and the sheath 1 are smooth and an O-ring seal 7 is interposed therebetween. It is obviously possible also to use one or more ribs such as 5 and one or more O-rings such as 7 in the same device.

FIGURE 3 shows an embodiment which differs from that of FIGURE 1 only in that the tube 2 should be introduced from the left to the right in the sheath; the diameter of the inner surface $1_1$ of the sheath exceeds the largest diameter of the thread 8; the tube 2 is introduced into the shaft 1 from the left to the right, i.e. by the inside of the sheath.

It should be noted that in order to assemble a tubular element as a connecting pipe between two sheaths, the tubular element has to be introduced from within one of the sheaths: one of its ends may be of the type shown in FIGURE 1 and the other end may be of the type shown in FIGURE 3.

The embodiment shown in FIGURE 4 differs from the above by the interlocking device which, in this case, consists of two cooperating annular shoulders which may be frusto-conical in shape and bear on one another: this embodiment may be used when the tube 2 is not subjected to tractive stresses which would tend axially to unseat the sheath 1 (directed from the left to the right in FIGURE 4).

The sheath 1 and the tube 2 to be joined (including the lip 3) may be made from two different materials having different co-efficients of expansion. The invention enables the material and thickness of the ring 4 to be selected in such a way that it keeps the lip 3 permanently forced against the sheath 1 end this in spite of the differential thermal expansions to which the system is subjected when in operation. In most cases, it will be preferable to make the ring 4 and the sheath 1 from materials having the same co-efficient of thermal expansion.

The deformation of the lip 3 is not limited to the elasticity range; it is advantageous to exceed the elastic limit if it is wished to crush O-ring seals 7 or ribs 5; on the contrary the deformation should be within the elastic limit if it is wished to facilitate dismantling.

In the embodiment illustrated in FIGURES 5 and 6 the lip 3 is deformed beyond the elastic limit. The lip 3 is constituted by a thin cylindrical skirt which may easily be expanded permanently until its rib 5 is in fluid-tight contact with the inner surface of the sheath 1, for example by introducing a robust frusto conical expander 12, constituting a shaping tool. The lip is retained in its flared condition by a chamfered ring 4 preferably retained by a cylindrical sleeve 13 which is screwed down in the sheath. The lip 3 here forms an extension of the radially inner part of a bulged portion of the tube 2, whereby a locking ring 14 may be screwed inside the sheath in the annular space between the sheath and the lip 3, before the latter is expanded.

The ring 14 acts as a lock-nut for the threaded parts 8 and 9 of the sheath 1 and the tube 2 and prevents accidental unscrewing of the latter. The radially inner surface of the ring 14 preferably has a curved axial section so as to present one or several bearing surfaces 15 against which the lip 3 may rest when expanded and/or when the fluid pressure prevailing in tube 2 is very high.

The thread of sleeve 13—and therefore the corresponding thread 16 of the sheath—may preferably have a thread and diameter identical to those of threads 8 and 9 with continuity of the threads so that the tube 2 may be introduced into the sheath 1 without it being necessary to provide any extra diameter for screwing the locking sleeve 14. This feature is of particular advantage when tube 2 is to pass through the core of a nuclear reactor: since the core is out of access after criticality has been achieved, the tube may be assembled and removed only through that channel (terminated by sheaths such as 1) to which it is connected, which sheaths are generally required to have as small a diameter as possible.

It is obvious that in the embodiment according to FIGURES 5 and 6, the flared lip 3 must be broken when dismantling the device, since the flared out portion cannot pass through the threaded parts.

By way of purely illustrative example, it may be indicated that a device according to the embodiment shown in FIGURE 3 has been constructed and tested wherein all the parts were made from steel; the lip had an outer diameter of 116 mm., a radial thickness of approximately 2 mm. and an axial length of 50 mm.

Although only certain selected embodiments of the invention have been chosen for purposes of illustration, it will be understood that these are in no way restrictive of the invention. It is reasonably to be expected that those skilled in the art can make variations and revisions of the invention as will incorporate the herein disclosed principles, and it is intended that such revisions and variations as incorporate the herein disclosed principles will be included within the scope of the following claims as equivalents of the invention.

What I claim is:

1. A device for fluid-tight connection of two tubular elements comprising cooperating means on said two tubular elements for connection of said elements against relative axial movement, an annular axially directed radially deformable lip integral with and thinner than one of said elements and disposed within a bore defined by the other of said elements, an annular rigid means independent of said elements having a radially outer surface frusto-conical along at least a part of its length axially engageable within said lip and of such radial dimension as to force part at least of said radially outer surface of said lip outwardly into sealing engagement with the confronting inner surface of said other tubular element, a radial clearance being provided between the radially outer surface of the thin annular terminal lip and said confronting inner surface of said other element, a lock ring shorter than said lip secured to one of said elements within said radial clearance acting as a stop for the other of said elements, a radial shoulder for the other of said elements cooperating with said lock ring and an annular bearing portion on said lock ring engaging an intermediate portion of said outer surface of said lip after it has been expanded to form a seal.

2. A device as described in claim 1, said elements having different coefficients of thermal expansion and said annular means and said element defining said bore having the same coefficient of thermal expansion.

References Cited by the Examiner

UNITED STATES PATENTS

| 2,187,217 | 1/40 | Winslow | 285—355 |
| 2,301,038 | 11/42 | Guarnaschell | 285—354 X |
| 2,453,391 | 11/48 | Whittingham | 285—14 |
| 2,511,134 | 6/50 | Stranberg | 285—382.7 |
| 2,746,486 | 5/56 | Gratzmuller | 285—110 |
| 2,793,059 | 5/57 | Woodling | 285—355 |
| 2,826,438 | 3/58 | Woodling | 285—382.7 |
| 3,069,187 | 12/62 | Collins | 285—110 |

FOREIGN PATENTS 741,426  12/32  France.

CARL W. TOMLIN, *Primary Examiner.*